US012684435B2

(12) United States Patent
Liu et al.

(10) Patent No.: US 12,684,435 B2
(45) Date of Patent: Jul. 14, 2026

(54) METHOD FOR CELL RESELECTION IN SPACE-AIR-GROUND INTEGRATED NETWORK, AND TERMINAL

(71) Applicant: CHINA TELECOM CORPORATION LIMITED, Beijing (CN)

(72) Inventors: Jiaxiang Liu, Beijing (CN); Zheng Jiang, Beijing (CN); Xiaoming She, Beijing (CN)

(73) Assignee: CHINA TELECOM CORPORATION LIMITED, Beijing (CN)

( * ) Notice: Subject to any disclaimer, the term of this patent is extended or adjusted under 35 U.S.C. 154(b) by 252 days.

(21) Appl. No.: 18/291,401

(22) PCT Filed: Apr. 25, 2023

(86) PCT No.: PCT/CN2023/090537
§ 371 (c)(1),
(2) Date: Jan. 23, 2024

(87) PCT Pub. No.: WO2023/207957
PCT Pub. Date: Nov. 2, 2023

(65) Prior Publication Data
US 2024/0340725 A1 Oct. 10, 2024

(30) Foreign Application Priority Data
Apr. 26, 2022 (CN) .......................... 202210444502.8

(51) Int. Cl.
*H04W 36/00* (2009.01)
*H04W 36/30* (2009.01)
*H04W 36/32* (2009.01)

(52) U.S. Cl.
CPC . *H04W 36/00835* (2018.08); *H04W 36/0007* (2018.08); *H04W 36/30* (2013.01); *H04W 36/32* (2013.01)

(58) Field of Classification Search
CPC ....... H04W 36/00835; H04W 36/0007; H04W 36/30; H04W 36/32; H04W 36/00; H04W 36/083; H04W 36/328; H04W 84/06
(Continued)

(56) References Cited

U.S. PATENT DOCUMENTS

| | | | | |
|---|---|---|---|---|
| 11,166,207 B2 * | 11/2021 | Xu | .................. | H04W 36/00838 |
| 11,632,166 B2 * | 4/2023 | Lucky | .................... | H04B 7/185 |
| | | | | 370/319 |

(Continued)

FOREIGN PATENT DOCUMENTS

| | | |
|---|---|---|
| CN | 111010708 A | 4/2020 |
| CN | 111294733 A | 6/2020 |

(Continued)

OTHER PUBLICATIONS

First Office Action for Japan Patent Application No. 2024-522593 of Nov. 26, 2024.

(Continued)

*Primary Examiner* — Mahendra R Patel
(74) *Attorney, Agent, or Firm* — Perilla Knox & Hildebrandt LLP; Kenneth A. Knox

(57) ABSTRACT

A method for cell reselection in a Space-Air-Ground Integrated Network, including: monitoring broadcast message, and obtaining coverage information of a serving cell and coverage information of a neighboring cell from the broadcast message, where the serving cell and the neighboring cell are non-terrestrial network cells or terrestrial network cells; determining, in response to determining that the serving cell is a non-terrestrial network cell, location relationship information between the terminal and the serving cell according to the coverage information of the serving cell, and initiating cell reselection measurement according to the location relationship information between the terminal and the serving
(Continued)

cell; and, performing cell reselection according to a cell reselection measurement result.

19 Claims, 3 Drawing Sheets

(58) Field of Classification Search
USPC ......................................................... 370/331
See application file for complete search history.

(56) References Cited

U.S. PATENT DOCUMENTS

| 2012/0120789 | A1 * | 5/2012 | Ramachandran | ........................... H04W 36/00224 370/220 |
|---|---|---|---|---|
| 2021/0068013 | A1 * | 3/2021 | Cheng | ................... H04W 48/18 |

FOREIGN PATENT DOCUMENTS

| CN | 111565428 | A | | 8/2020 | |
|---|---|---|---|---|---|
| CN | 112153706 | A | | 12/2020 | |
| CN | 112822732 | A | | 5/2021 | |
| CN | 111294733 | B | * | 7/2021 | ............ H04W 36/08 |
| CN | 113395717 | A | | 9/2021 | |
| CN | 114073128 | A | | 2/2022 | |
| EP | 2624630 | A1 | * | 8/2013 | ...... H04W 36/00835 |
| EP | 4068854 | A1 | * | 10/2022 | ............ H04W 48/20 |
| EP | 4192040 | A1 | | 6/2023 | |
| EP | 3866504 | B1 | * | 7/2025 | .......... H04W 36/302 |
| WO | WO-2021046821 | A1 | * | 3/2021 | ............ H04W 36/00 |
| WO | WO-2021159535 | A1 | * | 8/2021 | ............ H04W 84/06 |
| WO | 2021180154 | A1 | | 9/2021 | |
| WO | WO-2022001764 | A1 | * | 1/2022 | ............ H04W 36/30 |
| WO | 2022021100 | A1 | | 2/2022 | |
| WO | WO-2022038510 | A1 | * | 2/2022 | ............ H04W 48/16 |
| WO | WO-2022199430 | A1 | * | 9/2022 | ............ H04W 24/02 |
| WO | WO-2023060535 | A1 | * | 4/2023 | ............ H04W 36/00 |

OTHER PUBLICATIONS

First Office Action for China Patent Application No. 202210444502.8 of Feb. 11, 2025.

China Telecom, "Cell selection and reselection enhancements for NTN," in 3GPP TSG-RAN WG2 Meeting #116, Online, Nov. 1-12, 2021, R2-2109765.

ITL, "Remaining issue on idle/inactive mode," in 3GPP TSG-RAN WG2 Meeting #118, Online, May 9-20, 2022, R2-2205094.

Huawei and HiSilicon, "Discussion on RRC_IDLE mode issues in NTN," in 3GPP TSG-RAN WG2 Meeting #112-e, Online, Nov. 2-13, 2020, R2-2009637.

Third Office Action for CN Patent Application No. 202210444502.8 of May 9, 2025.

3GPP TSG RAN WG2 #113bis, "Cell selection and reselection enhancements for NTN," e-Meeting, Apr. 12-20, 2021, Agenda Item: 8.10.3.2, Source: Xiaomi, Document for: Discussion and Decision.

International Search Report for International Application No. PCT/CN2023/090537.

3GPP TS 38.300 V17.6.0 (Sep. 2023); Technical Specification Group Radio Access Network;NR; NR and NG-RAN Overall Description; Stage 2(Release 17).

3GPP TS 38.331 V17.6.0 (Sep. 2023); Technical Specification Group Radio Access Network;NR; Radio Resource Control (RRC) protocol specification(Release 17).

3GPP TS 38.304 V17.7.0 (Dec. 2023); Technical Specification Group Radio Access Network;NR;User Equipment (UE) procedures in Idle mode and RRC Inactive state.

Convida Wireless, "NTN Cell (re)selection enhancements," contribution R2-2106392, 3GPP TSG-RAN WG2 Meeting #114-e, Online, May 19-27, 2021.

Intel Corporation, "Discussion on TN prioritization over NTN for idle mode," contribution R2-2109639, 3GPP TSG-RAN WG2 Meeting #116e, E-Meeting, Nov. 1-12, 2021.

ZTE Corporation and Sanechips, "Report of [AT117-e][102][NTN] Idle mode open issues—2nd Round," contribution R2-2203543, 3GPP RAN WG2 Meeting #117-e, eMeeting, Feb. 21-Mar. 3, 2022.

First Office Action for CN Patent Application No. 202511611470.6 of Apr. 25, 2026.

ZTE Corporation and Sanechips, "System information for NTN and idle mode mobility for intra-NTN and TN-NTN case," 3GPP TSG-RAN WG2 Meeting #116bis-e, Document R2-2201003, Jan. 17-25, 2022.

Extended European Search Report for EP Patent Application No. 23795389.8 of Mar. 5, 2026.

* cited by examiner

400

410

420

METHOD FOR CELL RESELECTION IN SPACE-AIR-GROUND INTEGRATED NETWORK, AND TERMINAL

CROSS REFERENCE TO RELATED APPLICATIONS

The present application is a National Stage Application of International Application No. PCT/CN2023/090537 filed on Apr. 25, 2023 which claims the benefit of and priority to Chinese Patent Application No. 202210444502.8, filed on Apr. 26, 2022, the entire contents of both of which are incorporated herein by reference for all purposes.

TECHNICAL FIELD

The present disclosure relates to the field of wireless communication technology and, in particular, to a method for cell reselection in a Space-Air-Ground Integrated Network, a communication system, a terminal, a communication device, and other related devices.

BACKGROUND

As the future network evolution trend, space-air-ground integration will have far-reaching effects on the original network architecture and communication process. Unlike traditional cellular networks, a Space-Air-Ground Integrated Network includes two parts of a terrestrial network (TN) and a non-terrestrial network (NTN). The terrestrial network includes, for example, a cellular network, etc.; and the non-terrestrial network includes, for example, a satellite network, etc.

SUMMARY

According to some embodiments of the present disclosure, there is provided a method for cell reselection in a Space-Air-Ground Integrated Network, performed by a terminal, including:

monitoring broadcast message, and obtaining coverage information of a serving cell and coverage information of a neighboring cell from the broadcast message, where the serving cell and the neighboring cell are non-terrestrial network cells or terrestrial network cells;

determining, in response to determining that the serving cell is a non-terrestrial network cell, location relationship information between the terminal and the serving cell according to the coverage information of the serving cell, and initiating cell reselection measurement according to the location relationship information between the terminal and the serving cell; and performing cell reselection according to a cell reselection measurement result.

According to some embodiments of the present disclosure, there is provided a method for cell reselection in a Space-Air-Ground Integrated Network, performed by a communication device, including:

sending broadcast message, where the broadcast message includes coverage information of a present cell and coverage information of a neighboring cell, and the present cell and the neighboring cell are non-terrestrial network cells or terrestrial network cells, thus a terminal performs cell reselection according to the broadcast message.

According to some embodiments of the present disclosure, there is provided a terminal, including a memory and a processor coupled to the memory, where the processor is configured to execute a method for cell reselection in a Space-Air-Ground Integrated Network based on an instruction stored in the memory.

BRIEF DESCRIPTION OF THE DRAWINGS

The accompanying drawings that need to be used in the embodiments or description of the related art will be briefly described below. The present disclosure may be more clearly understood according to the following detailed description with reference to the accompanying drawings.

It is understood that the accompanying drawings in the following description are merely some embodiments of the present disclosure. For those of ordinary skill in the art, other drawings may be obtained according to these drawings without involving creative efforts.

DETAILED DESCRIPTION

The technical solutions in the embodiments of the present disclosure will be clearly and completely described below with reference to the accompanying drawings in the embodiments of the present disclosure.

Unless specifically stated, terms of "first" and "second" in the present disclosure are used to distinguish different objects, and are not used to represent the meaning of size or time sequence.

In some related arts, mobility management of a terminal in an idle state is mainly completed through cell selection/reselection, in which a target cell is selected according to wireless measurement signal strength.

It has been found through research that in a Space-Air-Ground Integrated Network, the difference between the wireless signal strength of a user in the center of an NTN cell and the wireless signal strength of the user at the edge of the NTN cell is not apparent. Therefore, the method for cell reselection according to the wireless measurement signal strength cannot satisfy the requirements of cell reselection in the Space-Air-Ground Integrated Network.

In the embodiments of the present disclosure, coverage information of related cells is added in the broadcast message, so that the terminal not only can select to initiate cell reselection measurement according to the wireless signal strength of the serving cell, but also can select to initiate cell reselection measurement according to the location relationship information between the terminal and the serving cell, thus the terminal selects a proper terrestrial network cell or a non-terrestrial network cell in the Space-Air-Ground Integrated Network for camping, which not only improves the accuracy and success rate of cell reselection, but also reduces the energy consumption and signaling overhead of the terminal.

Figure 1:
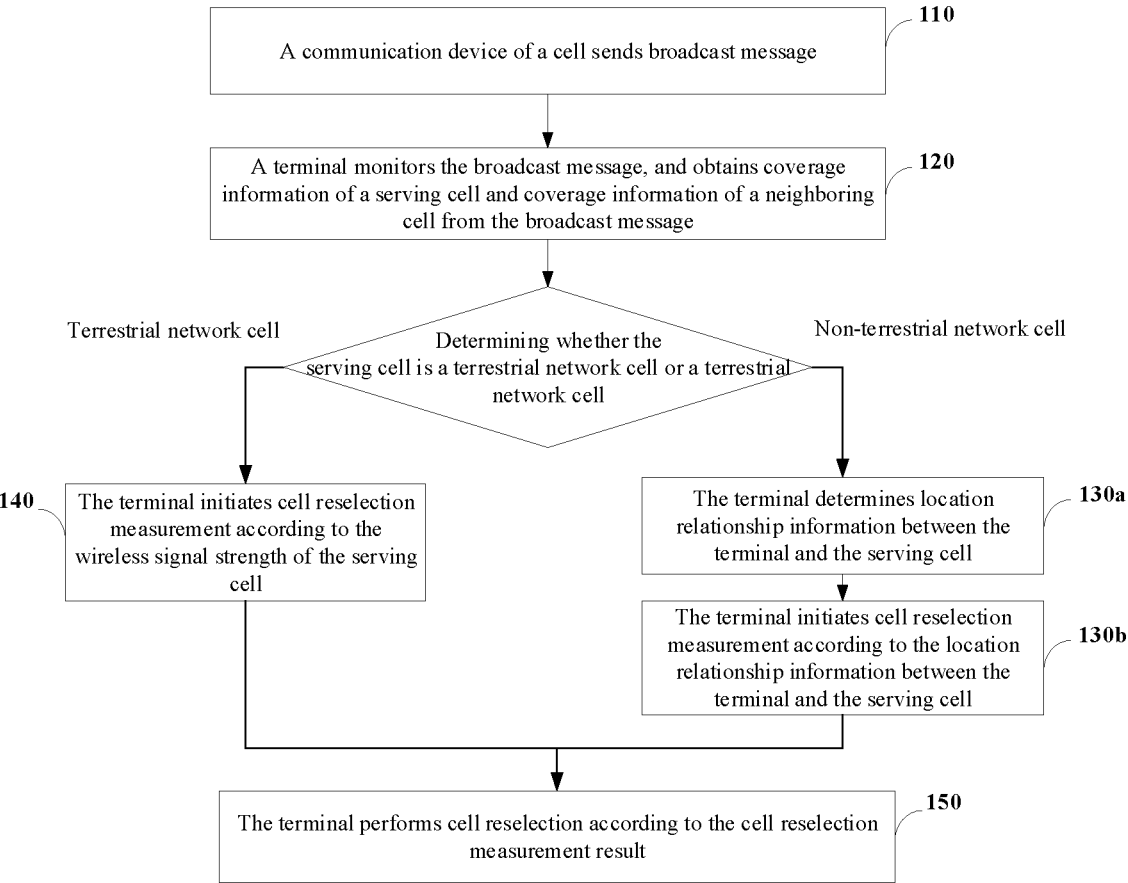
FIG. 1 shows a schematic flowchart of a method for cell reselection in a Space-Air-Ground Integrated Network according to some embodiments of the present disclosure.

FIG. 1 shows a schematic flowchart of a method for cell reselection in a Space-Air-Ground Integrated Network according to some embodiments of the present disclosure.

As shown in FIG. 1, the method for cell reselection in a Space-Air-Ground Integrated Network of this embodiment includes step 110 to step 150.

In step 110, a communication device of a cell sends broadcast message. The broadcast message includes coverage information of the present cell and coverage information of a neighboring cell. In the Space-Air-Ground Integrated Network, the present cell and the neighboring cell may be non-terrestrial network cells or terrestrial network cells.

The coverage information may be used to describe a boundary of a cell on one hand, and may also implicitly indicate the type of the cell on the other hand, where the type of the cell includes a non-terrestrial network cell or a terrestrial network cell. This is because the coverage area of the non-terrestrial network cell is far greater than the coverage area of the terrestrial network cell, and it may be determined that the type of the cell is a non-terrestrial network cell or a terrestrial network cell according to the coverage area of the cell.

According to needs, the broadcast message further includes indication information used for indicating the type of the cell, so as to indicate the type of the cell by using an explicit method.

In some embodiments, the coverage information includes information such as a cell center location and a cell radius, but the coverage information is not limited to such expressions.

The communication device of a terrestrial network cell that sends the broadcast message may be, for example, a base station or the like. The communication device of a non-terrestrial network cell that sends broadcast message may be, for example, a satellite or the like. However, it is not limited to the illustrated examples.

In step 120, the terminal monitors the broadcast message, and obtains coverage information of the serving cell and the coverage information of the neighboring cell from the broadcast message. The serving cell and the neighboring cell are non-terrestrial network cells or terrestrial network cells.

The terminal may periodically monitor the broadcast message. According to the information carried in the broadcast message, the terminal may obtain the coverage information of the serving cell and the coverage information of the neighboring cell from the broadcast message, and may further obtain the indication information for the type of each cell.

In step 130, if the serving cell is anon-terrestrial network cell, the terminal determines location relationship information between the terminal and the serving cell according to the coverage information of the serving cell (step 130a), and initiates cell reselection measurement according to the location relationship information between the terminal and the serving cell (step 130b).

Initiating cell reselection measurement by the terminal according to the location relationship information between the terminal and the serving cell includes: if the distance between the terminal and the serving cell is greater than a distance threshold, which indicates that the terminal is located at the edge of the current camping non-terrestrial network cell, initiating cell reselection measurement. The distance threshold may be set according to the coverage information of the non-terrestrial network cell.

In step 140, if the serving cell is a terrestrial network cell, the terminal initiates cell reselection measurement according to the wireless signal strength of the serving cell.

Initiating cell reselection measurement by the terminal according to the wireless signal strength of the serving cell includes: if the wireless signal strength of the serving cell is lower than an intensity threshold, which indicates that the terminal is located at the edge of the current camping terrestrial network cell, initiating cell reselection measurement. The intensity threshold may be set according to the signal strength of the terrestrial network cell.

In step 150, the terminal performs cell reselection according to the cell reselection measurement result.

The cell reselection measurement result obtained by the terminal performing cell reselection measurement includes measurement information of a wireless signal of the neighboring cell and movement information of the terminal, etc. Among them, the measurement information of the wireless signal is, for example, a wireless signal strength. The movement information of the terminal includes, for example, a movement direction, a movement speed, and a movement acceleration, etc.

In some embodiments, performing cell reselection by the terminal according to the cell reselection measurement result includes that: the terminal determines a first candidate cell set according to the measurement information of the wireless signal of the neighboring cell; and, the terminal selects a target cell for camping from the first candidate cell set according to the movement information of the terminal and the coverage information of the neighboring cell.

In some embodiments, determining the first candidate cell set by the terminal according to the measurement information of the wireless signal of the neighboring cell includes: determining a neighboring cell satisfying the R criterion as the first candidate cell set by the terminal according to the measurement information of the wireless signal of the neighboring cell.

R Criterion:

$$Rs = \text{Qmeas\_s} + Qhysts;$$

$$Rn = \text{Qmeas\_n} - \text{Qoffsets\_n}.$$

Among them:
  Qmeas_s is a quality measurement value of a signal received by a service cell, that is, a reference signal receiving power (RSRP) of a primary common control physical channel (P-CCPCH);
  Qmeas_n is a quality measurement value of a signal received by a neighboring cell;
  Qhysts is cell reselection hysteresis;
  Qoffsets_n is a difference between quality requirements of signals received by two cells (a serving cell and a neighboring cell).

It is prioritized according to the sizes of R parameters that includes Rs (R value of the serving cell) and Rn (R value of the neighboring cell). The higher the R value is, the higher the priority is. If the priority of the neighboring cell is higher than the priority of the current serving cell within the cell reselection time, the current serving cell is reselected onto the neighboring cell that satisfies the condition.

In some embodiments, selecting the target cell for camping from the first candidate cell set by the terminal according to the movement information of the terminal and the coverage information of the neighboring cell includes the following:

if the serving cell is a non-terrestrial network cell and all neighboring cells are non-terrestrial network cells, the terminal selects a candidate cell with the longest expected camping time from the first candidate cell set as the target cell for camping according to the movement information of the terminal (such as the movement direction, the movement speed, etc.) and the coverage information of the neighboring cell; or, if the serving cell is a non-terrestrial network cell and all neighboring cells are terrestrial network cells, the terminal takes a candidate cell with the highest priority in the first candidate cell set as the target cell for camping according to the R criterion; or, if the serving cell is anon-terrestrial network cell and neighboring cells include anon-terrestrial network cell and a terrestrial network cell, the terminal selects a candidate cell in a same direction as the movement direction of the terminal from the first candidate cell set as a second candidate cell set according to the movement direction of the terminal and the coverage information of the neighboring cell, and selects the target cell for camping from the second candidate cell set according to the movement speed of the terminal.

Among them, selecting the target cell for camping from the second candidate cell set according to the movement speed of the terminal includes: determining whether the movement speed of the terminal is higher than a speed threshold or not; if the movement speed of the terminal is higher than the speed threshold, selecting a non-terrestrial network cell from the second candidate cell set as the target cell for camping, so as to avoid frequent cell reselection; and if the movement speed of the terminal is not higher than the speed threshold, selecting a terrestrial network cell from the second candidate cell set as the target cell for camping, so that the terminal is optionally served by the terrestrial network cell, thus saving the power of the terminal.

In some other embodiments, selecting the target cell for camping from the first candidate cell set by the terminal according to the movement information of the terminal and the coverage information of the neighboring cell includes the following:

if the serving cell is a terrestrial network cell and all neighboring cells are non-terrestrial network cells, the terminal selects a candidate cell with the longest expected camping time from the first candidate cell set as the target cell for camping according to the movement information of the terminal (such as the moving direction, the movement speed, etc.) and the coverage information of the neighboring cell; or, if the serving cell is a terrestrial network cell and all neighboring cells are terrestrial network cells, the terminal takes a candidate cell with the highest priority in the first candidate cell set as the target cell for camping according to the R criterion; or, if the serving cell is a terrestrial network cell and neighboring cells include a non-terrestrial network cell and a terrestrial network cell, the terminal selects a candidate cell in a same direction as the movement direction of the terminal from the first candidate cell set as a second candidate cell set according to the movement direction of the terminal and the coverage information of the neighboring cell, and selects the target cell for camping from the second candidate cell set according to the movement speed of the terminal.

Among them, selecting the target cell for camping from the second candidate cell set according to the movement speed of the terminal includes: determining whether the movement speed of the terminal is higher than a speed threshold or not; if the movement speed of the terminal is higher than the speed threshold, selecting a non-terrestrial network cell from the second candidate cell set as the target cell for camping, so as to avoid frequent cell reselection; and if the movement speed of the terminal is not higher than the speed threshold, selecting a terrestrial network cell from the second candidate cell set as the target cell for camping, so that the terminal is optionally served by the terrestrial network cell, thus saving the power of the terminal.

In some other embodiments, selecting the target cell for camping from the first candidate cell set by the terminal according to the movement information of the terminal and the coverage information of the neighboring cell includes: selecting a candidate cell in a same direction as the movement direction of the terminal from the first candidate cell set as a second candidate cell set according to the movement direction of the terminal and the coverage information of the neighboring cell by the terminal, and selecting a candidate cell with a different type from the serving cell from the second candidate cell set as the target cell for camping. For example, when the terminal moves from an urban area to a suburban area, a terrestrial network cell of the urban area may be re-selected as a non-terrestrial network cell of the suburban area; or, when the terminal moves from the suburban area to the urban area, a non-terrestrial network cell of the suburban area may be re-selected as a terrestrial network cell of the urban area.

According to the embodiment, coverage information of the related cells is added in the broadcast message, so that the terminal not only can select to initiate cell reselection measurement according to the wireless signal strength of the serving cell, but also can select to initiate cell reselection measurement according to the location relationship information between the terminal and the serving cell, thus the terminal selects a proper terrestrial network cell or a non-terrestrial network cell in the Space-Air-Ground Integrated Network for camping, which not only improves the accuracy and success rate of cell reselection, but also reduces the energy consumption and signalling overhead of the terminal. Moreover, the terminal selects the target cell for camping according to the movement direction/speed of the terminal and the coverage information of the cell, thus further improving the accuracy of cell reselection and reducing the number of times for cell reselection.

Some examples of cell reselection in Space-Air-Ground Integrated Network are listed below.

Figure 2:
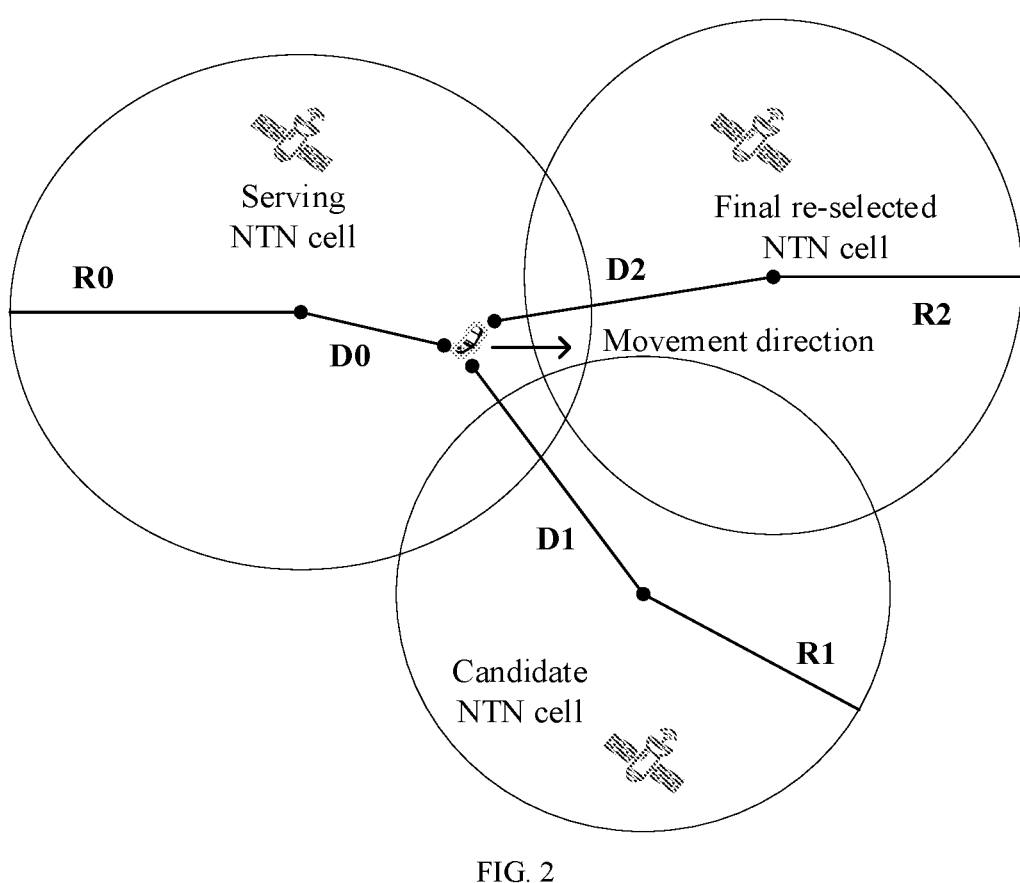
FIG. 2 shows a schematic diagram of cell reselection among each non-terrestrial network cell according to some embodiments of the present disclosure.

If the serving cell and the neighboring cell are all non-terrestrial network cells, cell reselection is performed among each non-terrestrial network cell. FIG. 2 shows a schematic diagram of cell reselection among each non-terrestrial network cell.

In step 1, an NTN cell broadcasts information of cell center locations and cell radiuses of a present cell and a neighboring NTN within a service range of the NTN;

In step 2, the terminal periodically monitors the broadcast message, calculates the location relationship between the location of the terminal and the center of the camping NTN cell, and initiates cell reselection measurement when exceeding a threshold value. The cell reselection measurement result includes information such as measurement of the wireless signal of the neighboring cell, the movement direction and the movement speed of the terminal.

In step 3, a re-selected cell is determined.

The terminal selects a candidate cell set S1 satisfying the R criterion according to a measurement result of the wireless signal; and the terminal selects a candidate cell with a longest expected camping time from the set S1 as the target cell for camping according to the movement information (such as the movement direction, the movement speed, etc.) of the terminal and the coverage information of the neighboring cell.

Application examples for cell reselection among each non-terrestrial network cell are listed below.

An NTN cell broadcasts the latitude and longitude information (X, Y) about the cell center and the cell radius R within the service range of the NTN cell, which can be added with original system information block (SIB) message, or be defined with a new SIB message.

The terminal periodically monitors the broadcast message, calculates a distance D0 between the location of the terminal and the center location of the current serving NTN cell, calculates a distance Di between the location of the terminal and the center location of the i-th neighboring NTN cell (D1 and D2 as shown in FIG. 2), and initiates cell reselection measurement when exceeding a threshold value. The threshold value includes a distance threshold value TH0 between the terminal and the current serving NTN cell, and the distance threshold value THi between the terminal and the i-th neighboring NTN cell, where $TH0=a0 \times R0$, $THi=ai \times Ri$, $a0$ and $ai$ are scaling factors, R0 is the radius of the current serving NTN cell, Ri is the radius of the i-th neighboring NTN cell. For example, taking two neighboring NTN cells in FIG. 2 as an example, where $TH1=a1 \times R1$ and $TH2=a2 \times R2$, any one of the following may be used as a condition for initiating cell reselection measurement: (1) initiating cell reselection measurement when the distance D0 between the terminal and the serving NTN cell is greater than the threshold value TH0; (2) initiating cell reselection measurement when the distance Di between the terminal and the neighboring NTN cell is less than the threshold value THi; and (3) initiating cell reselection measurement when D0 is greater than the distance threshold value TH0 for the serving NTN cell and Di is less than the distance threshold value Thi for the neighboring NTN cell. Among them, the cell reselection measurement result includes information such as the measurement of the wireless signal of the neighboring cell and the movement direction/speed of the terminal.

If the candidate cells satisfying the R criterion obtained by the terminal through the wireless channel measurement result are all NTN cells: {NTN cell 1, NTN cell 2, NTN cell 3, NTN cell 4, NTN cell 5, NTN cell 6}, the final re-selected cell is selected according to the longest expected camping time.

Figure 3:
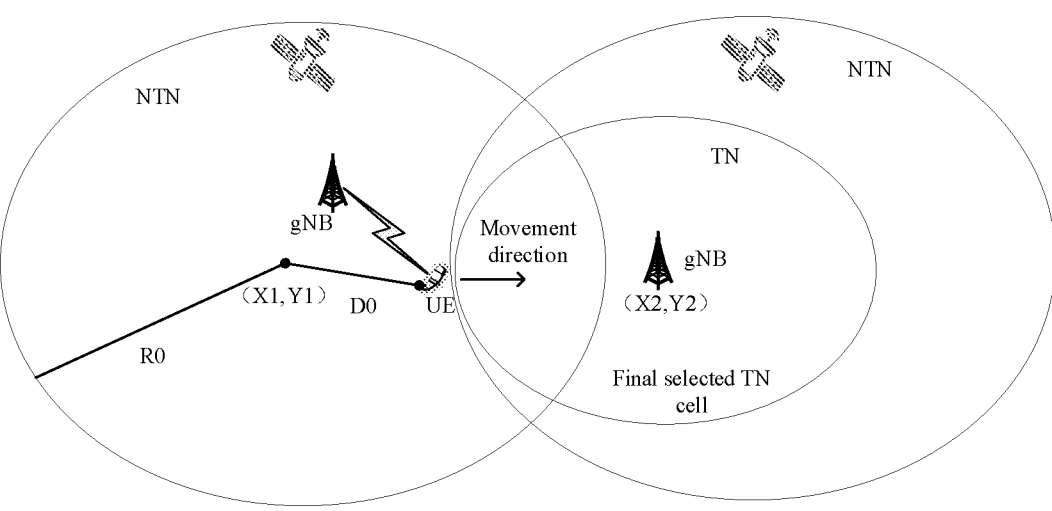
FIG. 3 shows a schematic diagram of cell reselection at the boundary between NTN and TN according to some embodiments of the present disclosure.

If at the boundary between NTN and TN, the NTN cell and the TN cell are neighboring cells to each other. FIG. 3 shows a schematic diagram of cell reselection at the boundary between NTN and TN.

In step 1, the NTN cell broadcasts the central location information of the present cell and the neighboring TN cell as well as the radius information of the present cell within the service range of the NTN cell; and, the TN cell broadcasts information of the central location and the cell radius of the neighboring NTN cell within the service range of the TN cell.

In step 2, the terminal periodically monitors the broadcast message; (1) if the terminal camps currently in the NTN cell, the terminal calculates the relationship between the location of the terminal and the center location of the camping NTN cell, and initiates cell reselection measurement when exceeding a threshold value, the cell reselection measurement result including information such as measurement of the wireless signal of the neighboring cell and movement direction/speed of the terminal; (2) if the terminal camps currently in the TN cell, the terminal initiates cell reselection measurement when the wireless signal strength is lower than a threshold value, the cell reselection measurement result including information such as measurement of the wireless signal of the neighboring cell and movement direction/speed of the terminal.

In step 3, a re-selected cell is determined.

The terminal selects a candidate cell set S1 satisfying the R criterion according to a measurement result of the wireless signal; the terminal selects a candidate cell set S2 in a same direction as the movement direction of the terminal from the set S1 according to the movement direction of the terminal and the coverage information of the neighboring cell; and then, the terminal selects the target cell for camping from the set S2 according to the movement speed of the terminal. For example, if the movement speed of the terminal is higher than a speed threshold, a non-terrestrial network cell is selected from the second candidate cell set as the target cell for camping, so as to avoid frequent cell reselection; and if the movement speed of the terminal is not higher than the speed threshold, a terrestrial network cell is selected from the second candidate cell set as the target cell for camping, so that the terminal is optionally served by the terrestrial network cell, thus saving the power of the terminal.

Application examples of cell reselection at the boundary between NTN and TN are listed below.

The NTN cell broadcasts the latitude and longitude information (X1, Y1) about the center of the present cell and the cell radius R0, as well as the latitude and longitude information (X2, Y2) about the center of the TN neighboring cell within the service range of the NTN cell. The above information may be added with an original SIB message or may be defined with a new SIB message.

If the terminal currently camps in the NTN cell to periodically monitor the broadcast message, the terminal calculates the distance D0 between the location of the terminal and the center location of the serving cell, and initiates cell reselection neighboring cell measurement when exceeding a threshold value. The cell reselection measurement result includes information such as measurement of the wireless signal of the neighboring cell and movement direction/speed of the terminal.

If the candidate cell set S1 satisfying the R criterion obtained by the terminal through the wireless channel measurement result is: {NTN cell 1, NTN cell 2, NTN cell 3, NTN cell 4, TN cell 5, TN cell 6}, the candidate cell set S2 is then narrowed to be {NTN cell 2, TN cell 5}according to the movement direction; and then, selection is performed according to the movement speed of the terminal. If movement speed of the terminal is relatively fast, such as in a train moving at high speed, the NTN cell 2 is selected from the set S2 as the target cell for camping, so as to avoid frequent cell reselection; and if the movement speed of the terminal is not fast, the TN cell 5 is selected from the set S2 as the target cell for camping, so that the terminal is optionally served by the terrestrial network cell, thus saving the power of the terminal.

Figure 4:
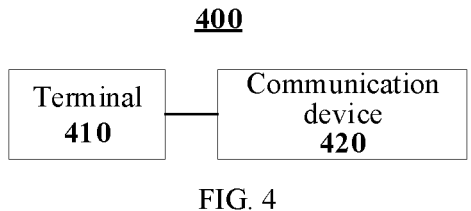
FIG. 4 shows a schematic diagram of a communication system according to some embodiments of the present disclosure.

FIG. 4 shows a schematic diagram of a communication system according to some embodiments of the present disclosure. As shown in FIG. 4, the communications system 400 of this embodiment includes a terminal 410 and a communication device 420.

The communication device 420 sends broadcast message, where the broadcast message includes coverage information of a present cell and coverage information of a neighboring cell.

The terminal 410 monitors the broadcast message, and obtains coverage information of a serving cell and coverage information of the neighboring cell from the broadcast message, where the serving cell and the neighboring cell are non-terrestrial network cells or terrestrial network cells. If the serving cell is a non-terrestrial network cell, the terminal 410 determines location relationship information between the terminal and the serving cell according to the coverage information of the serving cell, and initiates cell reselection measurement according to the location relationship information between the terminal and the serving cell; if the serving cell is a terrestrial network cell, the terminal 410 initiates cell reselection measurement according to the wireless signal strength of the serving cell; and the terminal 410 performs cell reselection according to the cell reselection measurement result.

Figure 5:
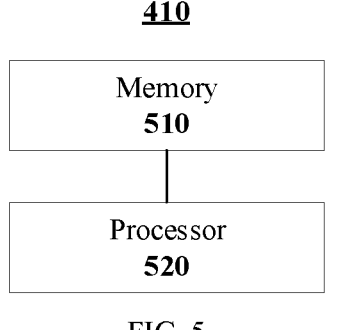
FIG. 5 shows a schematic diagram of a terminal according to some embodiments of the present disclosure.

FIG. 5 shows a schematic diagram of a terminal according to some embodiments of the present disclosure. The terminal is, for example, a user equipment such as a mobile phone and a tablet computer, etc.

As shown in FIG. 5, the terminal 410 of this embodiment includes a memory 510 and a processor 520 coupled to the memory 510, and the processor 520 is configured to execute the method for cell reselection in a Space-Air-Ground Integrated Network in any one of the foregoing embodiments based on an instruction stored in the memory 510.

Figure 6:
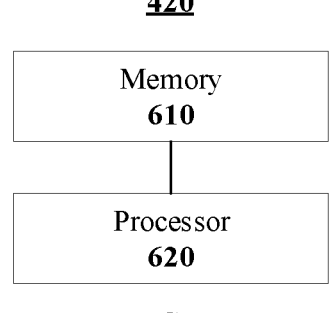
FIG. 6 shows a schematic diagram of a communication device according to some embodiments of the present disclosure.

FIG. 6 shows a schematic diagram of a communication device according to some embodiments of the present disclosure. A communication device of the terrestrial network cell for sending the broadcast message may be, for example, a base station or the like. A communication device of a non-terrestrial network cell for sending broadcast message may be, for example, a satellite or the like. However, it is not limited to the illustrated examples.

As shown in FIG. 6, the communication device 420 of this embodiment includes a memory 610 and a processor 620 coupled to the memory 610, and the processor 620 is configured to execute the method for cell reselection in a Space-Air-Ground Integrated Network in any one of the foregoing embodiments based on an instruction stored in the memory 610.

Among them, the memory 510, 610 may include, for example, a system memory, a fixed non-volatile storage medium, or the like. The system memory stores, for example, an operating system, an application, a boot loader, other programs, etc.

Among them, the processor 520, 620 may be implemented by using a general-purpose processor, a digital signal processor (DSP), an application specific integrated circuit (ASIC), a field programmable gate array (FPGA), or another discrete hardware component such as a programmable logic device, a discrete gate, or a transistor, etc.

The terminal 410 and the communication device 420 may further include an input/output interface, a network interface, a storage interface, or the like. These interfaces, as well as the memory and the processor, may be connected, for example, through a bus. Among them, the input/output interface provides a connection interface for an input/output device such as a display, a mouse, a keyboard, and a touch screen, etc. The network interface provides a connection interface for various networking devices. The storage interface provides a connection interface for an external storage device such as an SD card and a USB flash disk, etc. The bus may use any bus structure in a variety of bus structures. For example, the bus structure includes, but is not limited to, an industry standard architecture (ISA) bus, a micro channel architecture (MCA) bus, a peripheral component interconnect (PCI) bus.

Those skilled in the art should understand that the embodiment of the present disclosure may be provided as a method, a system, or a computer program product. Thus, the present disclosure may take the form of an entire hardware embodiment, an entire software embodiment, or an embodiment combining software with hardware aspects. Moreover, the present disclosure may take the form of a computer program product implemented on one or more non-transitory computer-readable storage medium (including but not limited to a disk memory, a CD-ROM, an optical memory, etc.) that includes computer program code.

The present disclosure is described with reference to flowcharts and/or block diagrams of methods, devices (systems), and computer program products according to embodiments of the present disclosure. It should be understood that each process and/or block in the flowcharts and/or block diagrams, and combinations of the processes and/or blocks in the flowcharts and/or block diagrams, can be implemented by computer program instructions. These computer program instructions can be provided to a processor of a general purpose computer, a special purpose computer, an embedded processor, or another programmable data processing device to generate a machine, such that an apparatus for implementing functions specified in one or more processes of the flowcharts and/or one or more blocks of the block diagrams is generated through the instructions executed by a processor of the computer or another programmable data processing device.

These computer program instructions may also be stored in a computer-readable memory that can direct a computer or another programmable data processing device to operate in a particular manner, such that the instructions stored in the computer-readable memory generate a product that includes an instruction apparatus. The instruction apparatus implements the functions specified in one or more processes of the flowcharts and/or one or more blocks of the block diagrams.

These computer program instructions may also be loaded onto a computer or another programmable data processing device such that a series of operational steps are performed on the computer or another programmable device to generate a computer-implemented process, thus the instructions executed on the computer or another programmable device provide steps for implementing the functions specified in one or more processes of the flowcharts and/or one or more blocks of the block diagrams.

The foregoing description is merely various embodiments of the present disclosure and do not intended to limit the present disclosure. Any modification, equivalent replacement, improvement, or the like made within the spirit and principle of the present disclosure should be included within the protection scope of the present disclosure.

What is claimed is:

1. A method for cell reselection in a Space-Air-Ground Integrated Network, performed by a terminal, comprising:
   monitoring broadcast message, and obtaining coverage information of a serving cell and coverage information of a neighboring cell from the broadcast message, wherein the serving cell and the neighboring cell are non-terrestrial network cells or terrestrial network cells;

determining, in response to determining that the serving cell is a non-terrestrial network cell, location relationship information between the terminal and the serving cell according to the coverage information of the serving cell, and initiating cell reselection measurement according to the location relationship information between the terminal and the serving cell; and performing cell reselection according to a cell reselection measurement result, wherein the cell reselection measurement result comprises measurement information of a wireless signal of the neighboring cell and movement information of the terminal, and performing the cell reselection according to the cell reselection measurement result comprises:

determining a first candidate cell set according to the measurement information of the wireless signal of the neighboring cell; and selecting a target cell for camping from the first candidate cell set according to the movement information of the terminal and the coverage information of the neighboring cell.

2. The method according to claim 1, further comprising initiating, in response to determining that the serving cell is a terrestrial network cell, the cell reselection measurement according to a wireless signal strength of the serving cell.

3. The method according to claim 1, wherein the movement information of the terminal comprises one or more of a movement direction and a movement speed.

4. The method according to claim 1, wherein determining the first candidate cell set according to the measurement information of the wireless signal of the neighboring cell comprises:

determining a neighboring cell satisfying an R criterion as the first candidate cell set according to the measurement information of the wireless signal of the neighboring cell.

5. The method according to claim 3, wherein selecting the target cell for camping from the first candidate cell set according to the movement information of the terminal and the coverage information of the neighboring cell comprises at least one of:

in response to determining that the serving cell is a non-terrestrial network cell and all neighboring cells are non-terrestrial network cells, selecting a candidate cell with a longest expected camping time from the first candidate cell set as the target cell for camping according to the movement information of the terminal and the coverage information of the neighboring cell;

in response to determining that the serving cell is a non-terrestrial network cell and all neighboring cells are terrestrial network cells, taking a candidate cell with a highest priority in the first candidate cell set as the target cell for camping according to an R criterion; or in response to determining that the serving cell is a non-terrestrial network cell and neighboring cells comprise a non-terrestrial network cell and a terrestrial network cell, selecting a candidate cell in a same direction as the movement direction of the terminal from the first candidate cell set as a second candidate cell set according to the movement direction of the terminal and the coverage information of the neighboring cell, and selecting the target cell for camping from the second candidate cell set according to the movement speed of the terminal.

6. The method according to claim 3, wherein selecting the target cell for camping from the first candidate cell set according to the movement information of the terminal and the coverage information of the neighboring cell comprises at least one of:

in response to determining that the serving cell is a terrestrial network cell and all neighboring cells are non-terrestrial network cells, selecting a candidate cell with a longest expected camping time from the first candidate cell set as the target cell for camping according to the movement information of the terminal and the coverage information of the neighboring cell;

in response to determining that the serving cell is a terrestrial network cell and all neighboring cells are terrestrial network cells, taking a candidate cell with a highest priority in the first candidate cell set as the target cell for camping according to an R criterion; or in response to determining that the serving cell is a terrestrial network cell and neighboring cells comprise a non-terrestrial network cell and a terrestrial network cell, selecting a candidate cell in a same direction as the movement direction of the terminal from the first candidate cell set as a second candidate cell set according to the movement direction of the terminal and the coverage information of the neighboring cell, and selecting the target cell for camping from the second candidate cell set according to the movement speed of the terminal.

7. The method according to claim 5, wherein selecting the target cell for camping from the second candidate cell set according to the movement speed of the terminal comprises at least one of:

in response to determining that the movement speed of the terminal is higher than a speed threshold, selecting a non-terrestrial network cell from the second candidate cell set as the target cell for camping; and in response to determining that the movement speed of the terminal is not higher than the speed threshold, selecting a terrestrial network cell from the second candidate cell set as the target cell for camping.

8. The method according to claim 1, wherein the coverage information is used for describing a boundary of a cell.

9. The method according to claim 8, wherein, the coverage information is further used for implicitly indicating a type of the cell;

the broadcast message further comprises indication information used for indicating the type of the cell; and wherein the type of the cell comprises a non-terrestrial network cell and a terrestrial network cell.

10. The method according to claim 1, wherein the coverage information comprises a cell center location and a cell radius.

11. The method according to claim 1, wherein initiating cell reselection measurement according to the location relationship information between the terminal and the serving cell comprises:

initiating the cell reselection measurement in response to determining that a distance between the terminal and the serving cell is greater than a distance threshold.

12. The method according to claim 2, wherein initiating cell reselection measurement according to the wireless signal strength of the serving cell comprises:

initiating the cell reselection measurement in response to determining that the wireless signal strength of the serving cell is lower than an intensity threshold.

13. The method according to claim 3, wherein selecting the target cell for camping from the first candidate cell set according to the movement information of the terminal and the coverage information of the neighboring cell comprises:

selecting a candidate cell in a same direction as the movement direction of the terminal from the first candidate cell set as a second candidate cell set according to the movement direction of the terminal and the coverage information of the neighboring cell, and selecting a candidate cell with a different type from the serving cell from the second candidate cell set as the target cell for camping, wherein a type of the serving cell is a non-terrestrial network cell or a terrestrial network cell.

14. A method for cell reselection in a Space-Air-Ground Integrated Network, performed by a communication device, comprising:

sending a broadcast message, wherein the broadcast message comprises coverage information of a present cell and coverage information of a neighboring cell, and the present cell and the neighboring cell are non-terrestrial network cells or terrestrial network cells, thus directing a terminal to perform cell reselection according to the broadcast message;

wherein the present cell is a non-terrestrial network cell, the coverage information of the present cell is used by the terminal to determine location relationship information between the terminal and the present cell, the location relationship information between the terminal and the present cell is used by the terminal to initiate cell reselection measurement, and a cell reselection measurement result is used by the terminal to perform the cell reselection;

wherein the cell reselection measurement result comprises measurement information of a wireless signal of the neighboring cell and movement information of the terminal;

and wherein, the measurement information of the wireless signal of the neighboring cell is used by the terminal to determine a first candidate cell set, and the movement information of the terminal and the coverage information of the neighboring cell are used by the terminal to select a target cell for camping from the first candidate cell set.

15. The method according to claim 14, wherein the coverage information is used for describing a boundary of a cell.

16. The method according to claim 15, wherein:

the coverage information is further used for implicitly indicating a type of the cell;

the broadcast message further comprises indication information used for indicating the type of the cell; and wherein the type of the cell comprises a non-terrestrial network cell and a terrestrial network cell.

17. A terminal, comprising:

a memory; and a processor in data communication with the memory, wherein the processor is configured to execute a method for cell reselection in a Space-Air-Ground Integrated Network based on program instruction stored in the memory, and the method comprising:

monitoring broadcast message, and obtaining coverage information of a serving cell and coverage information of a neighboring cell from the broadcast message, wherein the serving cell and the neighboring cell are non-terrestrial network cells or terrestrial network cells;

determining, in response to determining that the serving cell is a non-terrestrial network cell, location relationship information between the terminal and the serving cell according to the coverage information of the serving cell, and initiating cell reselection measurement according to the location relationship information between the terminal and the serving cell; and performing cell reselection according to a cell reselection measurement result, wherein the cell reselection measurement result comprises measurement information of a wireless signal of the neighboring cell and movement information of the terminal, and performing the cell reselection according to the cell reselection measurement result comprises:

determining a first candidate cell set according to the measurement information of the wireless signal of the neighboring cell; and selecting a target cell for camping from the first candidate cell set according to the movement information of the terminal and the coverage information of the neighboring cell.

18. A communication device, comprising:

a memory; and a processor in data communication with the memory, wherein the processor is configured to execute the method for cell reselection in a Space-Air-Ground Integrated Network according to claim 15 based on an instruction stored in the memory.

19. A communication system, comprising: the terminal according to claim 17.

* * * * *